United States Patent [19] — [11] 4,176,251
Odlen et al. — [45] Nov. 27, 1979

[54] MODULAR SWITCHING SYSTEM

[75] Inventors: Lars Odlen, Lund; Anders Hansson, Trelleborg, both of Sweden

[73] Assignee: Transcale A.B., Vasteras, Sweden

[21] Appl. No.: 905,888

[22] Filed: May 15, 1978

[51] Int. Cl.$^2$ .................... H04Q 5/00

[52] U.S. Cl. .................... 179/1 SW; 179/1 B

[58] Field of Search .................... 179/1 SW, 1 VL, 1 B, 179/1 AT, 84 SS

[56] References Cited

U.S. PATENT DOCUMENTS

| | | | |
|---|---|---|---|
| 3,199,226 | 8/1965 | Joslow | 179/1 B |
| 3,806,658 | 4/1974 | Anderson et al. | 179/16 F |
| 3,920,906 | 11/1975 | Gargini | 179/1 B |

*Primary Examiner*—Thomas W. Brown

*Assistant Examiner*—E. S. Kemeny

[57] ABSTRACT

A modular switching system including a plurality of switch modules connected in cascade. Each module includes a portion of a signal bus, terminals for connection of an external device, switch means for connecting the external device to the signal bus and an addressable logic circuit. An external device can be connected to the signal bus by providing to the logic circuit cascade a number of address pulses corresponding to the position in the cascade of the selected external device. By providing a number of such cascades an entire system, for example an audio system, can be formed. The system can be expanded simply by connecting additional switch modules to each or any cascade and an external device connected thereto is automatically addressable according to its position in the cascade.

21 Claims, 11 Drawing Figures

FIG.1
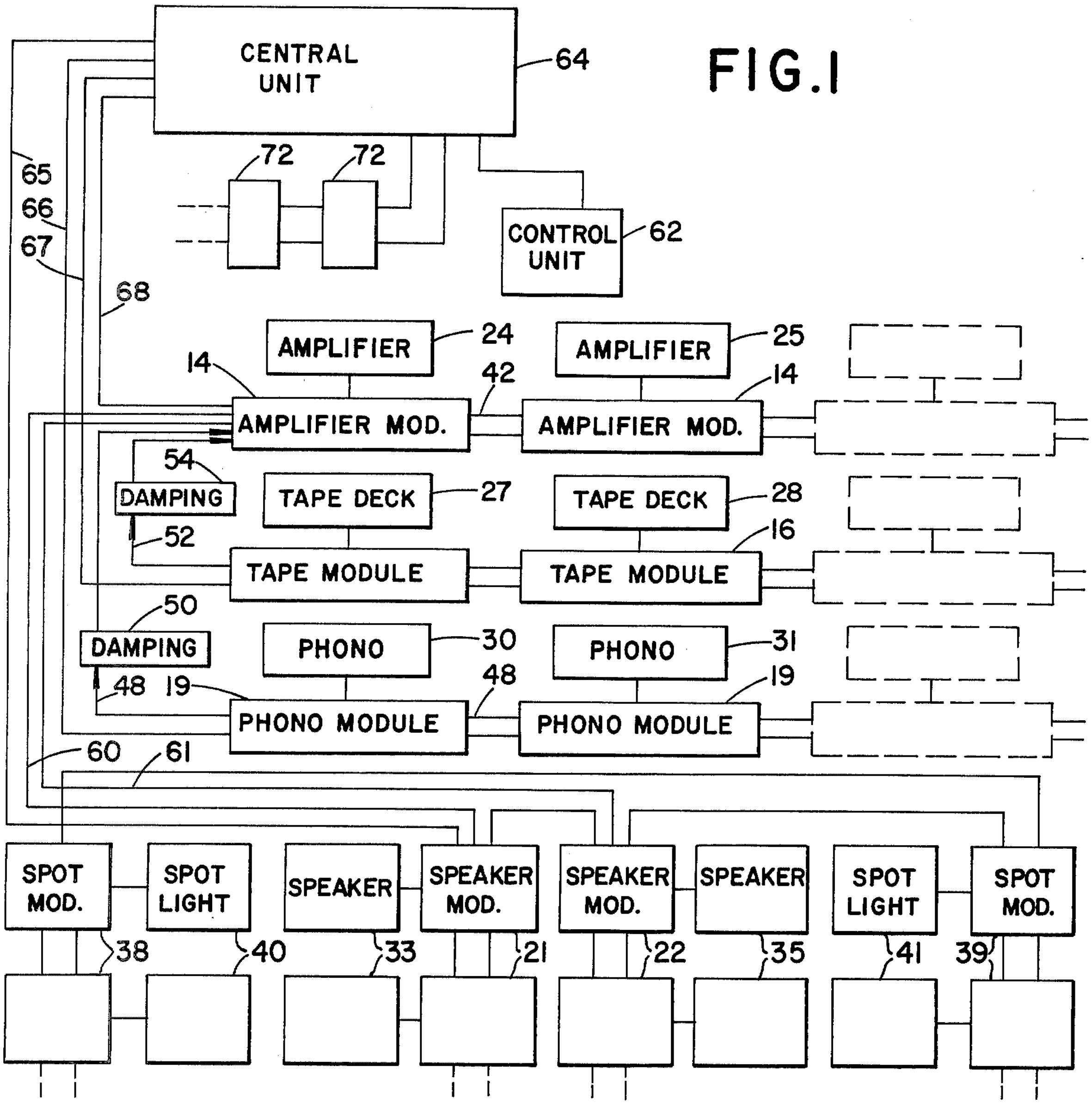
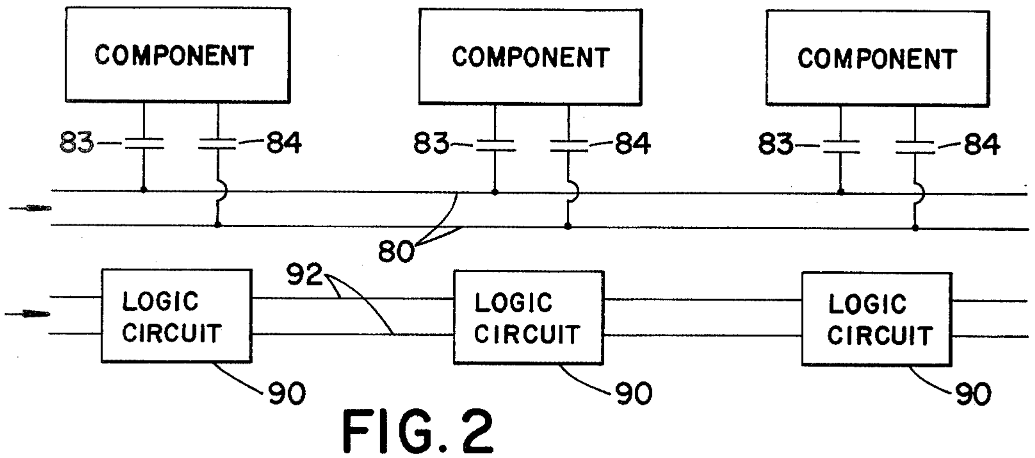
FIG.2

TO PHONO CASCADE
TO TAPE CASCADE
TO AMP CASCADE
TO DAMPING CASCADE
TO SPEAKER CASCADE
MUTE TO DAMPING CIRCUITS
DAMPING PROGRAM
FROM DAMPING SELECTOR MODULES
J-K F.F.
BINARY OCTAL DECODER
PRESET COUNTER
PRESET DOWN COUNTER
FROM CONTROL UNIT

MODULAR SWITCHING SYSTEM

BACKGROUND OF THE INVENTION

This invention relates to switching systems and more particularly to a switching method and apparatus for selectively connecting one of a group of similar devices to a common bus or the like.

In situations where it is necessary to compare the performance of a number of alternative components of a system it is essential to have the ability to insert and remove components in the system quickly and easily. In audio showrooms, for example, it is necessary to demonstrate a variety of alternative components in an audio system and to switch back and forth between alternative components. A basic audio system will usually include a phonograph, a tape deck, an amplifier and at least one speaker. The switching requirements for demonstrating a number of one type of component are significant and increase rapidly when several types of components are demonstrated.

It has been customary to use centralized switching for making the various component substitutions in audio applications and in other fields as well. Wiring is thus provided from each speaker to a speaker switching center, from each amplifier to an amplifier switching center, from each phonograph to a phonograph switching center and so forth. Connections from the selected phonograph to the selected amplifier and from there to the selected speaker are made by jumper wires, or in some cases, through relay contacts. The disadvantages of such a system are apparent, both visually and performance-wise. Heavy bundles of wires overlap and criss-cross in various paths behind walls and counters in audio showrooms. The volume of wires makes the wiring susceptible to noise pickup and cross-talk and limits the number of component combinations that can be demonstrated.

SUMMARY OF THE INVENTION

According to the present invention there is provided an improved switching apparatus and method for selecting one desired device from a group of similar devices and connecting it into a system. A number of interchangeable switch modules are connected in a chain or cascade and define a signal bus. Each module has signal terminals for connection of an external device. A logic circuit associated with each switch module is responsive to a train of address pulses for subtracting one pulse and passing the remainder to the succeeding logic circuit and for providing an output signal when the pulse train includes only a single pulse. Switch means is associated with each logic circuit and responds to the output signal therefrom to connect the signal terminals to the signal bus. Any device may, therefore, be connected to the signal bus by providing to the logic circuit cascade a number of address pulses corresponding to the position in the cascade of the switch module associated with the selected device.

An entire system can be built by providing a separate cascade of switch modules for each type of device in the system and connecting their signal buses. In an audio system, for example, a number of phonographs may be provided in one cascade with tape recorders in another, loud speakers in another and amplifiers in still another. Each cascade is addressed individually to select the desired audio component from the number of components in the cascade and the various caacades are connected together to form an audio system.

Signal conditioning may be provided for an audio system including a damping circuit in the signal bus which is programmable to provide a selected amount of damping. Programming is provided by a cascade of damping selector modules which are addressed by the same train of address pulses provided to the speaker module cascade. This allows damping to be set automatically for each speaker so that different speakers can be compared accurately despite differences in efficiency.

A switching system according to the present invention is extremely flexible in that the number of like components available in each cascade is easily increased simply by adding switching modules. The switching modules added are identical to those in the cascade and no new programming or other identification is required since the added modules inherently respond to a number of address pulses corresponding to their positions in the cascade.

BRIEF DESCRIPTION OF THE DRAWINGS

FIG. 1 is a block diagram of a switching system embodying the present invention applied to the switching of audio components for demonstration purposes.

FIG. 2 is a block diagram of a cascade of switch modules according to the present invention.

DESCRIPTION OF A PREFERRED EMBODIMENT

Figure 3:
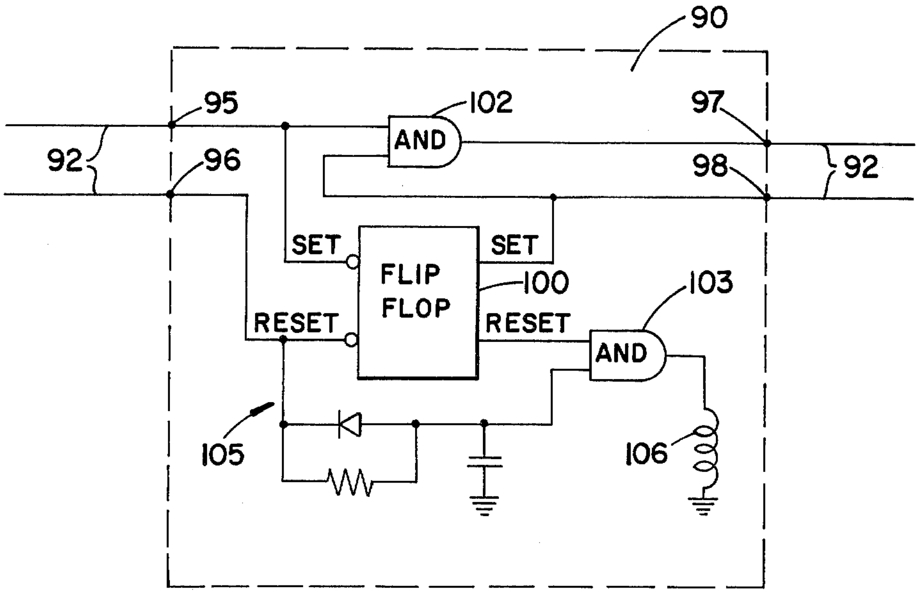
FIG. 3 is a block diagram of an addressable logic circuit for a switch module.

There is shown in FIG. 1 a switching system embodying the present invention and employed for demonstrating a selection of components in an audio system. The system includes a series of amplifier switch modules 14, a series of tape switch modules 16, a series of phonograph switch modules 19, a series of left speaker switch modules 21 and a series of right speaker switch modules 22, all connected in respective cascades. Each module has connected thereto an audio component for demonstration purposes. Thus, each amplifier module 14 has an audio amplifier 24, 25 connected thereto, each tape module a tape deck 27, 28, each phonograph module a phonograph 30, 31, and each left and right speaker module a speaker 33, 35. A series of left and right spotlight modules 38, 39, respectively, are connected in cascade and a spotlight 40 is connected to each.

Each switch module contains a portion of at least one signal bus and an addressable logic circuit. In response to address signals to the chain of logic circuits a particular module in each cascade is caused to connect its associated audio component to the signal bus. The signal bus 48 for the phonograph cascade is connected to the amplifier phonograph input signal bus through a signal damping circuit 50 and the tape signal bus 52 is connected to the amplifier tape input signal bus through a similar damping circuit 54. The amplifier output signal buses 60, 61 for the left and right stereo channels, respectively are connected to the left speaker and right speaker signal buses, respectively. Thus, when an audio component from each cascade is connected to its respective signal bus, an audio system is formed. A particular audio component may be replaced with a like component by placing an address on the address bus corresponding to the position in the cascade of the new component. For example, if it is desired to replace amplifier 24 in FIG. 1, the first amplifier in the cascade, with amplifier 25, the second amplifier in the cascade, then an address corresponding to position 2 in the amplifier cascade is placed on the amplifier address bus.

The addresses to the various component cascades are provided from a control unit 62 through a central unit 64 and lines 65, 66, 67 and 68 to the respective cascades. Each address is in the form of a pulse train having a number of pulses therein corresponding to the position in the cascade of the selected component. The same pulse train is supplied to both the left and right speaker cascade so that both speakers are selected simultaneously. The same signal is also supplied to the left and right spotlight cascades which permits the selected left and right speakers to be spotlighted as they are demonstrated.

A series of damping selector modules 72 is connected in cascade and receives the speaker address pulse train from central unit 64. Each damping selector module 72 is associated with a pair of left and right speaker modules 21, 22 and is manually programmable to control signal damping circuits 50 and 54 to provide a desired degree of damping for its associated speakers. The damping selector modules are instructed from control unit 62 to provide no damping or to provide the preprogrammed damping for the selected speaker pair as described below. Control unit 62 also provides a muting signal to damping circuits 50 and 54 to cause the circuits to attenuate the audio signals to the selected speakers by 20 dB. The muting of the audio signals is provided to lower the sound level and permit conversation in the audio showroom.

FIGS. 2, 3 and 4 illustrate the construction and operation of the switch modules by means of which a desired component is selected and connected to the signal bus. As shown in FIG. 2, each switch module includes a segment of signal bus 80. A pair of switch contacts 83, 84 are provided to connect the associated component to signal bus 80. The switch contacts 83, 84 of each switch module are operated under control of a logic circuit 90 which is connected in a logic circuit cascade 92. Basically, the logic circuits are adapted to receive a pulse train having a number of pulses therein corresponding to the position in the cascade of the component to be connected to the signal bus. The logic circuit in the position corresponding to the number of pulses in the pulse train operates the contacts 83, 84 to connect the associated component to the signal bus 80.

FIGS. 3 and 4 illustrate the construction and operation of a logic circuit 90. The logic circuit receives a train of pulses at address terminals 95, 96, subtracts one pulse from the train and transfers the remainder to transfer terminals 97, 98 which are connected to the address terminals of the succeeding logic circuit. Each logic circuit includes a bistable element such as a flip-flop 100 and a pair of AND gates 102 and 103. The set and reset inputs of flip-flop 100 are connected to address terminals 95 and 96 and the set and reset outputs are connected to inputs of gates 102 and 103, respectively. The remaining input to gate 102 is from address terminal 95 which is also connected to the set input of flip-flop 100. The remaining input to gate 103 is from address terminal 96 through a circuit 105 which provides a delay for positive pulses. The output signal from gate 103 operates switch contacts 83 and 84 which are shown as being the contacts of a relay 106.

Figure 4A:
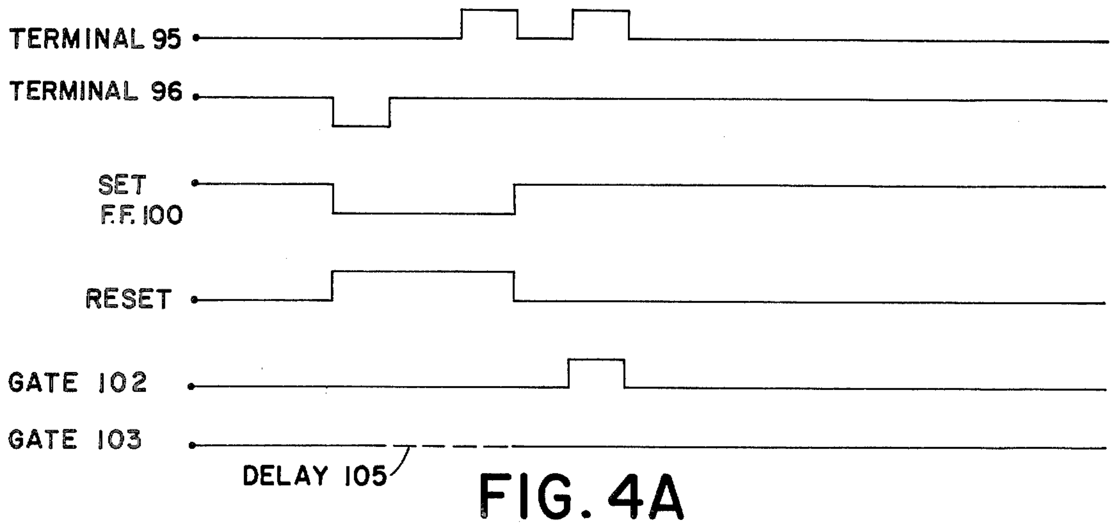
FIGS. 4A to 4C are pulse timing diagrams illustrating the operation of a cascade of logic circuits.
Figure 4B:
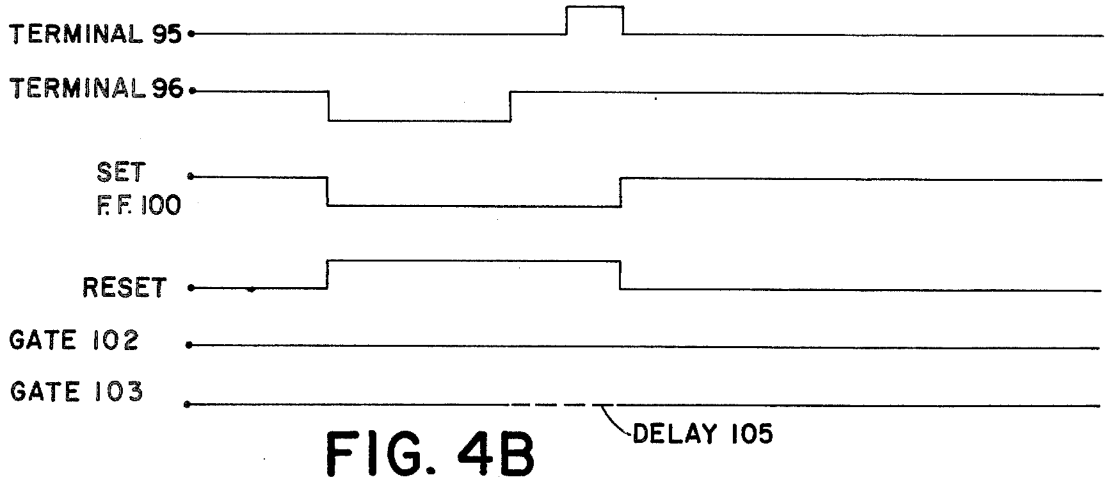
Figure 4C:
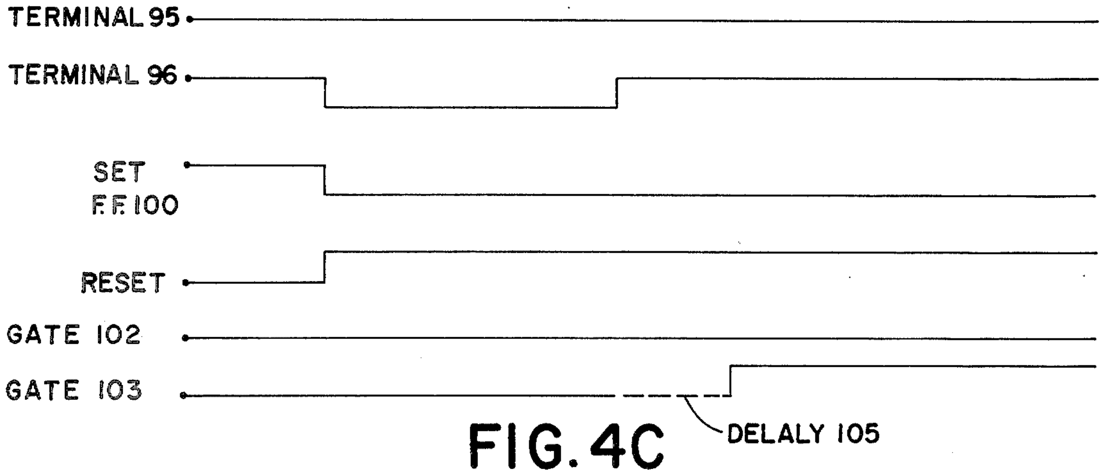

FIGS. 4A to 4C illustrate the operation of each of 3 logic circuits in a cascade in response to a train of address pulses for selecting the third component in the cascade. Referring to FIG. 4A, the pulse train at address terminals 95 and 96 of the first circuit includes a leading negative pulse at terminal 96 followed by a pair of positive pulses at terminal 95. Flip-flop 100 is set or reset by a negative transition at the appropriate input and, accordingly, is reset by the leading edge of the pulse at terminal 96. The set output of flip-flop 100 is connected through transfer terminal 98 to the reset input of the flip-flop in the succeeding logic circuit. Thus, the negative transition from each flip-flop 100 when reset is transmitted to the succeeding logic circuit to reset the flip-flop therein. Accordingly, each flip-flop in each logic circuit in the cascade is reset by the leading edge of the first pulse in the pulse train. This pulse inhibits gate 103 in each logic circuit and disconnects any component which had been connected to the signal bus. The first pulse, therefore, operates as a clearing pulse for the cascade.

When the clearing pulse at terminal 96 has passed, gate 103 would be enabled but for the presence of delay circuit 105. On the trailing edge of the first pulse from terminal 95 flip-flop 100 is again set which inhibits gate 103 and enables gate 102. Succeeding pulses at terminal 95 are passed through gate 102 to transfer terminal 97 which is connected to terminal 95 of the succeeding logic circuit.

As shown in FIG. 4B, the pulse train at address terminals 95 and 96 of the succeeding logic circuit is the pulse train supplied to the preceding logic circuit less one pulse at terminal 95. Flip-flop 100 of the second logic circuit is reset on the leading edge of the pulse at terminal 96 and is reset on the trailing edge of the first pulse at terminal 95. Gate 102 is thus not enabled until the trailing edge of the pulse at terminal 95 and subtracts that pulse. Thus, only the pulse at terminal 96 is transferred to the succeeding logic circuit.

As shown in FIG. 4C, flip-flop 100 in the third logic circuit is reset on the leading edge of the pulse at terminal 96 but is not set since there are no pulses at terminal 95. Gate 103 is enabled at the end of the pulse at terminal 96 and after the delay 105 and connects the component associated with switch module number 3 to the logic bus.

As will be noted from the foregoing, that logic circuit is selected by the address pulses which receives only a single complete pulse at terminal 96. The preceding logic circuits in the cascade receive at least one additional pulse at terminal 95 while the succeeding logic circuits receive only the leading edge of the clearing pulse at terminal 96.

Figure 5:
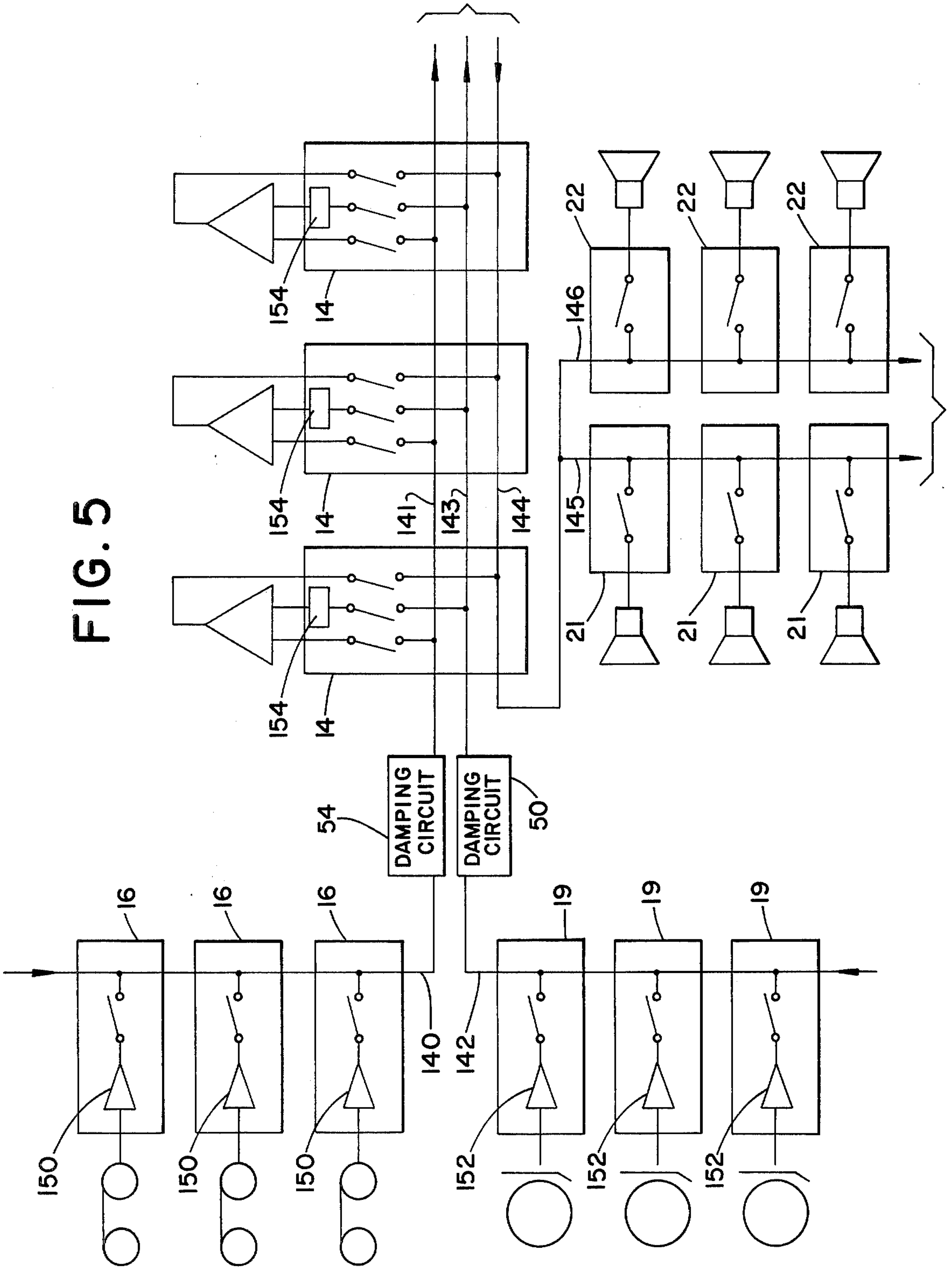
FIG. 5 is a block diagram illustrating the signal distribution path in an audio system employing the present invention.

FIG. 5 illustrates the distribution and switching of audio signals in an audio system connected in accordance with the present invention. A cascade of tape switch modules 16 defines a tape signal bus 140 which is connected through damping circuit 54 to the tape input signal bus 141 of a cascade of amplifier switch modules 14. A cascade of phonograph switch modules 19 defines a phonograph bus 142 which is connected through damping circuit 50 to the phonograph input signal bus 143 of the amplifier cascade. The amplifier output bus 144 is connected to the signal buses 145 and 146 of the cascades of left speaker switch modules 21 and right speaker switch modules 22. It will be appreciated that each bus may include more than one line and that the appropriate number of contacts will be provided in the respective modules to switch all of the lines in the bus. Also, more than one bus may be included in a cascade. For example, the tape and phonograph buses may each comprise stereo right and left channel buses and the amplifier output bus may include a right channel bus to the right speaker modules 22 and a left channel bus to the left speaker modules 21.

It is desirable for a number of reasons to provide conditioning of the audio signals. The input signals, especially in the phonograph circuit, are very low values and at high impedance levels and accordingly are very susceptible to noise and frequency distortion because of cable capacitances. To remedy these problems, each tape switch module 16 is provided with a preamplifier 150 between the tape deck and the tape signal bus and each phonograph switch module is provided with a preamplifier 152 between the phonograph and the phonograph signal bus. It will be appreciated that for stereo operation, a preamplifier will be provided for each channel. Each preamplifier converts the high impedance level of the input device to a low output impedance. The phonograph preamplifiers 152 also provide voltage gain. The phonograph signal is restored to its original level by resistive attenutators 154 which are provided at the phonograph input of each amplifier.

Another reason for conditioning the audio signals is that different speakers have different efficiencies. In order to compare different speakers it is necessary to maintain the same sound output from all of them despite their different efficiencies. It is for this purpose that the signal damping circuits 50 and 54 are inserted into the phonograph and tape signal buses. The damping circuits provide a selectable amount of signal attenuation for each speaker pair so that different speakers can be evaluated with the same sound output. The output impedance of the amplifiers and the dynamic properties of the speakers remain unaffected by accomplishing the damping at the input rather than the output of the amplifiers. Muting or general reduction in sound level is also accomplished by controlling the damping circuits.

Figure 6:
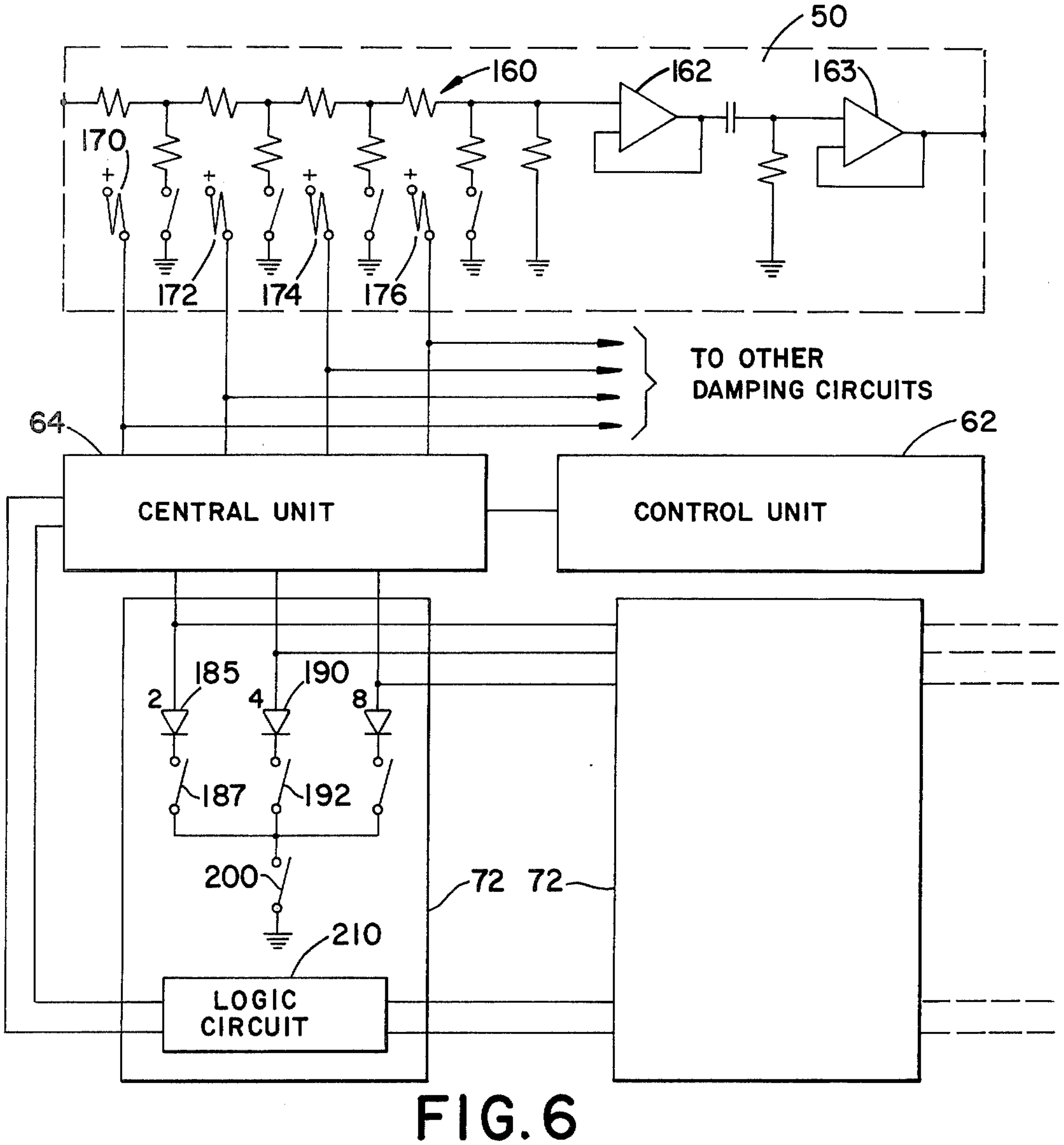
FIG. 6 is a combined block and schematic diagram illustrating a programmable signal damping arrangement for audio systems connected according to the present invention.

FIG. 6 shows the arrangement of the damping circuits 50, 54 with the damping selector switch modules 72 (FIG. 1) for selecting a desired degree of damping. Only a single damping circuit 50 is shown and it will be understood that the remaining damping circuits are identical. The damping circuits are preferably included within the first amplifier switch module. An amplifier module containing damping circuits should, therefore, be positioned as the first module in the amplifier cascade. Each damping circuit includes a four stage resistive attenuator 160 followed by amplifier stages 162 and 163. Each attenuator stage is selected by operating a relay which has a contact in circuit with a resistor in that stage. Operation of relay 170 selects the first stage and introduces 2 dB of attenuation in the signal. Operation of relays 172 and 174 introduces, respectively, 4 and 8 dB of attentuation. By operating various combinations of relays 170, 172 and 174 a range of attentuation from 0 to 14 dB is available in 2 dB steps. Relay 176 is operated by selecting the muting function and introduces 20 dB of attenuation for lowering the sound level in the audio showroom to permit conversation.

The respective relays 170 to 176 of all damping circuits are connected in parallel and to the central unit 64. The damping selector relays 170 to 174 are connected through the central unit in a manner to be described below to the damping selector modules 72. Each damping selector module includes a diode 185 and a toggle switch 187 for operating relay 170 to select 2 dB damping, a diode 190 and toggle switch 192 for operating relay 172 to select 4 dB damping and a diode 195 and toggle switch 196 for operating relay 174 to select 8 dB damping. One pole of each switch 187, 192, 196 is connected to a switch 200 which may be a solid state switch or a contact of a relay. In either case switch 200 is operated by a signal from an addressable logic circuit 210 corresponding to that shown in FIG. 3. Switch 200 is operated by logic circuit 210 when the particular damping selector module 72 is addressed by a pulse train as described above. The cascade of damping selector modules 72 receives the same address pulse train as is provided to the cascade of speaker switch modules. If, therefore, the speaker pair in position 10 in the speaker cascade is selected the damping selected for that speaker pair will be that set by the toggle switches in the damping selector module in position 10 in the damping selector module cascade. The damping may be turned on or off from control unit 62 through central unit 64 in a manner to be described below.

Muting is selected by operating relay 176 from control unit 62 through central unit 64 as described below.

Figure 7:
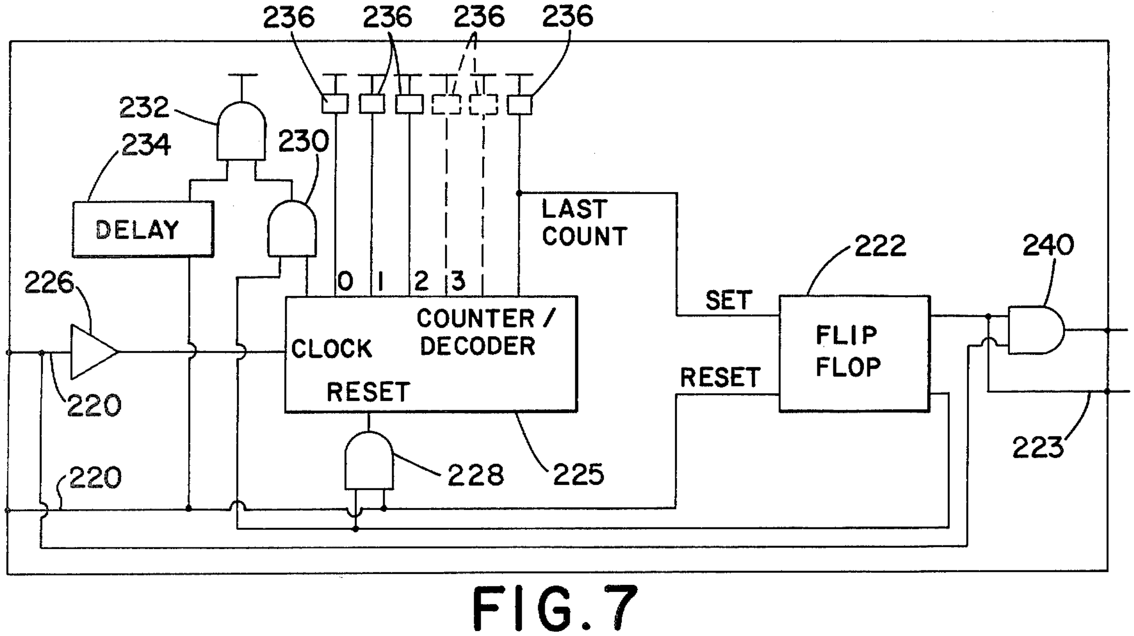
FIG. 7 is a block diagram of a circuit in which a plurality of addressable logic circuits are incorporated in a single package.

It has been found convenient and economical to provide a number of switch modules in a single package. Preferably, two switch modules are provided in each package for the phonographs, tapes and amplifiers and ten modules in each package for the left and right speakers and the damping selectors. In cases where several switch modules are provided in the same package the addressable logic circuits may be simplified by the use of a counter-decoder as illustrated in FIG. 7. A train of address pulses is provided to address terminals 220 including a first or clearing pulse to the reset inputs of flip-flop 222 and a train of counting pulses to the clock pulse input of the counter-decoder 225 through inverter 226. The clearing pulse resets the counter-decoder through a NOR gate 228 and resets flip-flop 222 which transfers the leading edge of the clearing pulse to the succeeding logic circuits through line 223. The reset output of flip-flop 222 also enables a gate 230 which enables another gate 232 during the reset or "O" state of counter-decoder 225. At the end of the clearing pulse and a delay provided by delay circuit 234 which corresponds to delay circuit 105 in FIG. 3, gate 232 is enabled and provides an output signal if no counting pulses have been received to switch counter-decoder 225 to its next state.

As counting pulses are received, counter-decoder 225 is stepped by each one to its next state to provide a sequence of output signals on lines 235 through delay circuits 236. If the number of counting pulses received is not sufficient to step counter-decoder 225 through its entire sequence then the last state reached in the counter-decoder provides an output signal in line 235. The output signal operates a solid state switch or relay to connect an audio component to the signal bus or, in the case of a damping selector module, to operate a switch corresponding to switch 200 in FIG. 6. If counter-decoder 225 is stepped through its entire sequence then flip flop 222 is set on the trailing edge of the signal indicating the last state of the counter-decoder and enables a gate 240. Succeeding counting pulses are transferred through gate 240 to the succeeding logic circuits.

Thus, the logic circuit arrangement including counter-decoder 225 operates to subtract a number of address pulses corresponding to the number of states in counter-decoder 225 and provide the remainder to succeeding logic circuits in the cascade. Each state of the counter decoder may be viewed as receiving a train of address pulses, subtracting one pulse and passing the remainder to the succeeding state. A state provides an output signal when only a single pulse is received to step the counter-decoder to that state and no pulses are received to step it out of that state.

Figure 8:
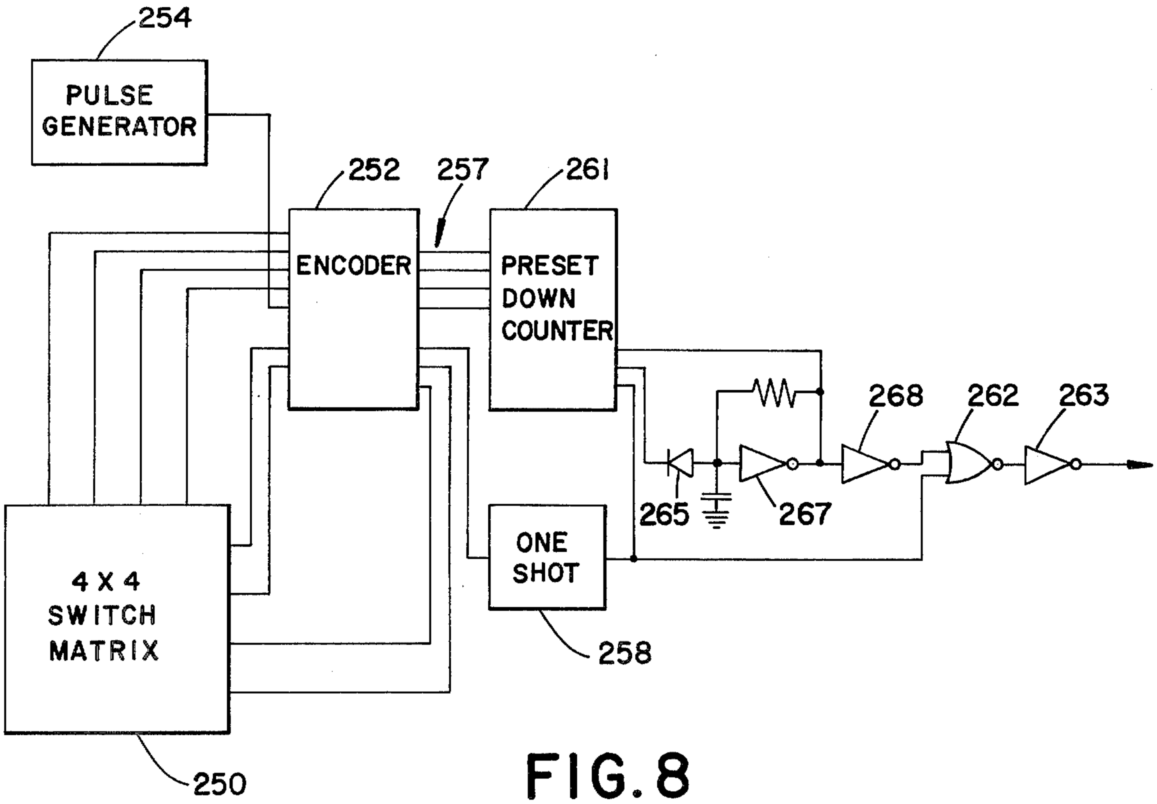
FIG. 8 is a block diagram of a control unit through which address commands are input to the switching system.
Figure 9:
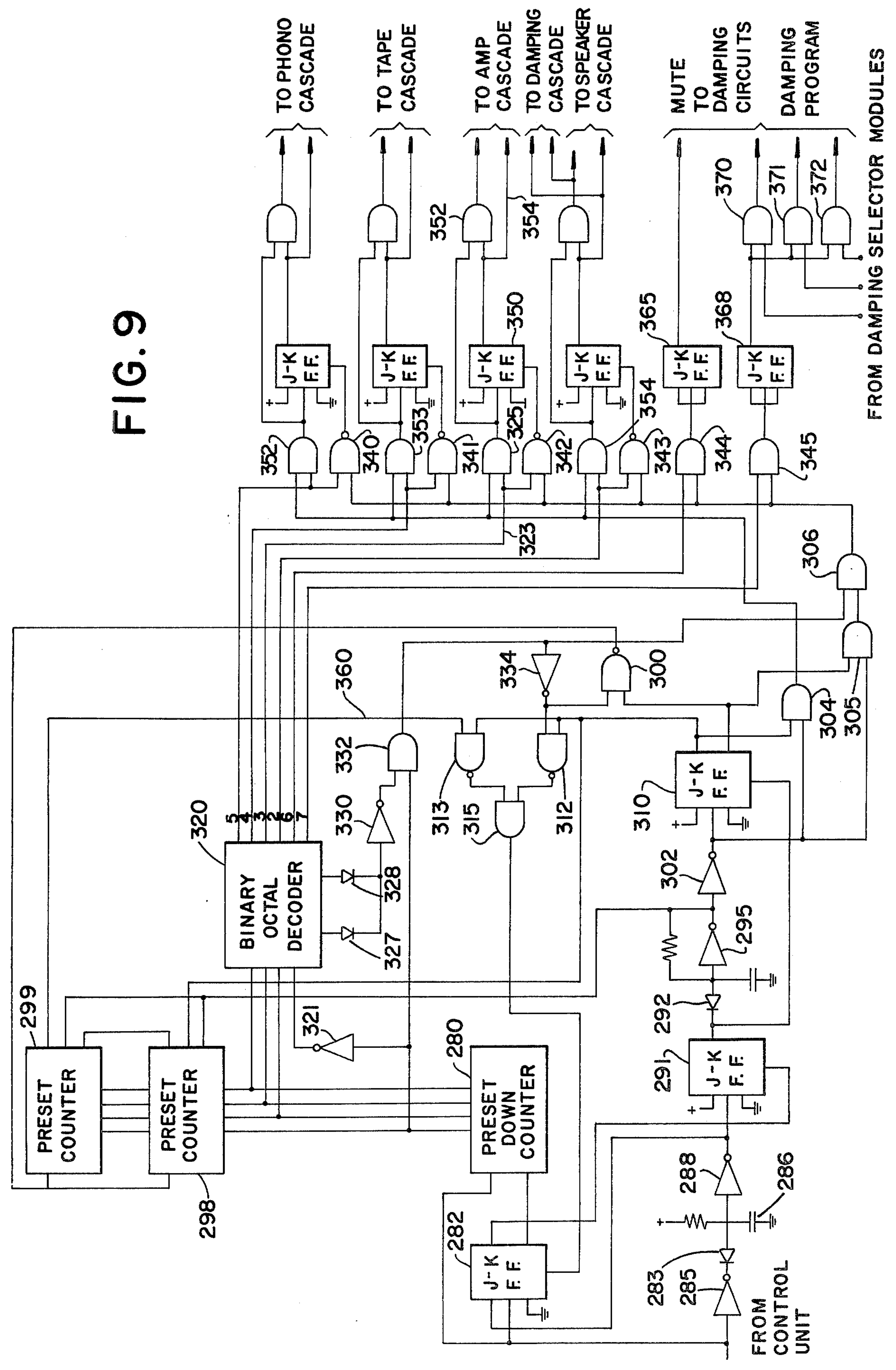
FIG. 9 is a block diagram of a central unit which controls the switching system in response to address commands from the control unit.

FIGS. 8 and 9 illustrate the control unit and central unit, respectively, which provide the train of address pulses to connect a particular component to the signal bus in a particular cascade. Referring to FIG. 8, the control unit 62 (FIG. 1) includes a 4×4 switch matrix generally designated 250 which is connected to a sixteen key encoder 252. The matrix includes sixteen switches for causing when operated a binary number from 0 to 15 to be loaded into the encoder 252. The switches are operated by push buttons representing the numbers 0 to 9, the components phonograph, tape, amplifier and speaker and the mute and damp functions. Operation of the numbered switches causes the corresponding binary code to be loaded into encoder 252. Operation of the mute switch loads a code of 10, damp a code of 11, phonograph a code of 12, tape a code of 13, amplifier a code of 14 and speaker a code of 15.

The switch matrix inputs to encoder 252 are continuously scanned at a rate determined by pulses from a pulse generator 254. When a closed switch is detected the binary code corresponding thereto is provided on output lines 257 of the encoder along with a signal to fire one shot 258. The output of one shot 258 presets a down counter 261 with the count from encoder 252. The pulse from one shot 258 is also provided through OR gate 262 and inverter 263 to the central unit. When counter 261 is preset it provides a high level signal to reverse bias diode 265 and permit a pulse generator 267 to generate negative pulses. The pulses are provided to counter 261 to count it down and through an inverter 268, OR gate 262 and inverter 263 to the central unit. Pulse generator 267 continues to generate pulses until counter 261 is counted down to "0" and provides an output signal to forward bias diode 265 and inhibit pulse generator 267.

Thus, for each actuation of a switch in matrix 250 the control unit provides the central unit with a train of pulses. To select amplifier "32" in the cascade, for example, switch number 3 would be actuated and 3 pulses plus the additional pulse from one shot 258 would be provided to the central unit in the manner described above. Switch number 2 would then be actuated to provide a total of 3 pulses followed by actuation of the amplifier select switch to provide a total of 15 pulses.

Referring now to FIG. 9, the central unit receives pulses from the control unit, counts and stores them and sends them out as address pulses to the appropriate cascade. Prior to receiving such pulses a down counter 280 has been preset to a count of "9" by the reset state of a flip-flop 282. The first pulse in the train from the control unit has no effect on flip-flop 282 nor on counter 280 but forward biases a diode 283 through an inverter 285. A capacitor 286 is discharged and causes the output of an inverter 288 to go positive and enable the set input of flip-flop 282. The succeeding pulses in the train maintain diode 283 forward biased, set flip-flop 282 and decrement counter 280.

When the pulse train ends, diode 283 is reverse biased so that capacitor 286 is again charged and causes inverter 288 to set flip-flop 291. The output from flip-flop 291 reverse biases diode 292 and permits a pulse generator 295 to generate a pulse. The pulse is transmitted to counters 298 and 299 which have their preset inputs enabled by a NAND gate 300 and transfers the contents of counter 280 to counter 298. The pulse from pulse generator 295 also probes gates 304, 305, and 306 through inverter 302 but neither gate 304 nor 306 is enabled. On the trailing edge of the pulse from pulse generator 295 flip-flop 310 is set and enables one input of gates 312 and 313. The remaining input to gate 313 is not an enabling signal but gate 312 is enabled so long as the count in counter 280 is between "0" and "9" which will be the case unless the number of pulses from the control unit was greater than 10. The signal from gate 312 passes OR gate 315 and counter 280 to "9" and resets flip-flops 291 and 310. Pulse generator 295 is inhibited by flip-flop 291 from generating further pulses.

Thus, at the end of the first pulse train for selecting, for example, amplifier "32" the central unit has received 4 pulses 3 of which have counted down preset counter 280 from a count of "9" to a count of "6" and that count has been transferred to counter 298.

The next pulse train which, in the example, represents the "2" digit for selecting amplifier "32" is handled in exactly the same way with counter 280 being counted down from a count of "9" to a count of "7". The contents of counter 298 are transferred to counter 299 and the contents of counter 280 are transferred to counter 298. Counter 299, therefore, stores a count of "6" and counter 298 stores a count of "7".

The third pulse train which, in the example, indicates that the amplifier cascade is to be addressed includes 15 pulses 14 of which decrement counter 280 from a count of "9" down to a count of "3". Counts less than "8" are decoded by a binary to octal decoder 320 which is enabled by the most significant bit of counter 280 through an inverter 322. Decoder 320 decodes the count of "3" in counter 280 and provides an enabling signal on line 322 to an AND gate 325. The "0" and "1" outputs of decoder 320 are provided through an OR gate of diodes 327 and 328 and an inverter 330 to an AND gate 332 the remaining input to which is the most significant bit from the output of counter 280. AND gate 332 provides an output signal when the count in counter 280 is between "10" and "15". The output signal from AND gate 332 enables gate 306 and disenables gates 300 and 312 through inverter 334.

At the end of the pulse train from the control unit, flip-flop 291 is set by inverter 288 as described above and enables pulse generator 295 to provide counting pulses to counters 298 and 299. The first pulse from pulse generator 295 also passes gates 305 and 306 both of which are enabled and probes gates 340 to 345. Gate 342 is enabled along with gate 325 by the output from decoder 320 and provides a pulse to clear flip-flop 350 which inhibits AND gate 352 and provides the leading edge of the first or clearing pulse in the address pulse train on line 354. On the trailing edge of the first pulse from pulse generator 295 flip-flop 310 is set and enables counters 298 and 299 to count pulses from pulse generator 295. Flip-flop 310 also enables AND gate 304 and pulses being counted in counters 298 and 299 are passed through gate 304 to probe gate 325 along with gate 352, 353, and 354. Only gate 325 is enabled by decoder 320 and passes pulses to set flip-flop 350 which returns line 354 to a high level to complete the clearing pulse. Succeeding pulses pass gate 352 and become the counting pulses in the train of address pulses in the amplifier cascade.

Pulses from pulse generator 295 continue to be counted in counters 298 and 299 until the maximum count of "99" is reached at which time, for the given example, a total of 32 pulses would have been provided to the amplifier cascade. When counters 298 and 299 have reached their maximum count an output signal is provided in line 360 which enables gate 313 to provide a clear pulse to flip-flop 282 through OR gate 315. Flip-flop 282 presets counter 280 and clears flip-flop 291 which clears flip-flop 310 and inhibits pulse generator 295 from generating further pulses.

Any other amplifier or any phonograph, tape deck or speaker pair may be connected to its signal bus in the same manner by selecting the desired number and identification of the component to be connected using the control unit 62. The number of the phonograph, tape deck, amplifier and speaker pair currently in the system can be displayed by providing circuitry for counting the pulses to the respective switch module cascades and displaying the count.

The selection of the mute or damp function is accomplished by actuating the appropriate switch in the control unit which produces a train of the appropriate number of pulses to decrement counter 280. At the end of the pulse train the count in counter 280 is decoded by decoder 320 which enables gate 344 for the mute function or gate 345 for the damping function. Gate 344 provides a signal to complement flip-flop 365 which provides an output signal to muting relay 176 (FIG. 6) in the damping circuit. Muting may be terminated by actuating the muting switch in the control unit to send another train of pulses which is counted and decoded in the same manner and provides a signal to complement flip-flop 265 to its opposite state.

Selection of the damping function is substantially the same as for the muting function with a signal from gate 345 being provided to complement flip-flop 368 which provides an enabling signal to AND gates 370, 371, and 372. The remaining input to each of the gates 370 to 372 is from the damping selector modules 72 (FIG. 6) and the output from each gate is to the relays 170 to 174 (FIG. 6) in the damping circuits to select the degree of damping programmed by the damping selector modules. Damping is terminated in the same manner as muting. A display can be provided of whether or not damping or muting has been selected by employing flip-flops 365 and 368.

It will be apparent that a switching system embodying the present invention is extremely simple to install and installation can be accomplished in much less time than required for previous systems. The cascades of switch modules can be made as long as desired subject only to the practical limitations of power consumption and time delay caused by transmitting a very large number of pulses. it has been found practical to form cascades with as many as 99 modules. It has been found advantageous to use CMOS units in the logic circuits because of their low power consumption and relative insensitivity to noise, although other circuitry may be used. Relay contacts have been illustrated for connecting the audio components to the signal bus, but it will be appreciated that solid state switches may be employed.

What is claimed is:

1. A logic circuit responsive to a train of address pulses in accordance with its position in a cascade of similar logic circuits comprising address terminal means, transfer terminal means, means responsive to said train of address pulses at said address terminal means for subtracting one of said pulses and passing the remainder to said transfer terminal means, and means responsive to the receipt of only a single pulse at said address terminal means for providing an output signal.

2. A logic circuit as claimed in claim 1 wherein said substracting means includes bistable means switched to a first state by a first pulse in said pulse train and switched to a second state by a subsequent pulse in said pulse train, and first gate means responsive to said second state of said bistable means for passing pulses in said pulse train to said transfer terminal means.

3. A logic circuit as claimed in claim 2 wherein said means for providing an output signal comprises second gate means responsive to said first state of said bistable means and to the passage of said first pulse for providing said output signal.

4. A logic circuit as claimed in claim 3 wherein the output of said bistable means is connected to said transfer terminal means as the first pulse in the train to the succeeding logic circuit.

5. A logic circuit as claimed in claim 3 wherein said address terminal means comprises a first address terminal for coupling said first pulse to said second gate means and to an input of said bistable means for switching it to said first state, and a second address terminal for coupling succeeding pulses in said train to said first gate means and to an input of said bistable means for switching it to said second state, and wherein said transfer terminal means comprises a first transfer terminal for connecting the output of said bistable means to the first address terminal of the succeeding logic circuit and a second transfer terminal for connecting the output of said first gate means to the second address terminal of the succeeding logic circuit.

6. A logic circuit as claimed in claim 1 further comprising switch means associated with said logic circuit and adapted to control apparatus external to said logic circuit in response to said output signal.

7. Switching apparatus comprising a plurality of logic circuits connected in cascade, each of said logic circuits being responsive to a train of address pulses for subtracting one pulse and transferring the remainder to the succeeding logic circuit and for providing an output signal when said train includes only a single pulse, and switch means associated with each logic circuit and adapted to control apparatus external to said logic circuit in response to the output signal therefrom.

8. Switching apparatus as claimed in claim 7 wherein said logic circuits include a counter for counting said address pulses and count decoding means for providing said output signal in response to counting of the last pulse in said pulse train, and means for transferring pulses remaining after said counter has reached its capacity to the succeeding logic circuit when the number of pulses in the train is greater than the capacity of said counter.

9. Switching apparatus comprising a plurality of switch modules connected in cascade and defining a signal bus, each of said modules having signal terminals for connection of an external unit thereto, logic means associated with each module, each of said logic means being responsive to a train of address pulses for subtracting one pulse and transferring the remainder to the succeeding logic means and for providing an output signal when said pulse train includes only a single pulse, and switch means associated with each logic means and responsive to the output signal therefrom for connecting said signal terminals to said signal bus.

10. Switching apparatus as claimed in claim 9 wherein each of said logic means includes bistable means switched to a first state by a first pulse in said pulse train and switched to a second state by a subsequent pulse in said pulse train, first gate means responsive to said second state of said bistable means for passing pulses in said pulse train to the succeeding logic means, and second gate means responsive to said first state of said bistable means and to the passage of said first pulse for providing said output signal.

11. Switching apparatus for selectively connecting a single device in a group of similar devices to a common signal bus comprising means for providing a pulse train having a predetermined number of pulses, a plurality of logic means connected in cascade to receive said pulse train, switch means associated with each of said logic means and arranged to operate in response to an output signal from the associated logic means to connect an associated device to said signal bus, each associated switch means and logic means having an address corresponding to its position in the cascade, said cascade of logic means being responsive to said pulse train to cause the logic means having a position in the cascade corresponding to the number of address pulses in the train to provide an output signal to its associated switch means, whereby any device may be connected to the signal bus by providing a number of address pulses corresponding to the position of the switch means associated with said device.

12. Switching apparatus as claimed in claim 11 wherein said means for providing a pulse train includes counting means for storing a signal corresponding to the desired number of pulses in said pulse train, switch means for loading said signal into said counting means and a pulse generator responsive to said counting means for providing a number of address pulses corresponding to the signal contents of said counter.

13. Apparatus as claimed in claim 11 wherein each logic means is responsive to the train of pulses at its input for subtracting one pulse from the train and transferring the remainder to the succeeding logic means and for providing an output signal when it receives only a single pulse.

14. A method for selectively connecting a single device of a group of similar devices to a common signal bus comprising the steps of providing switch means for connecting each of said devices to said signal bus and switch operating means for each switch means, arranging said switch operating means in cascade, assigning an address to each said switch operating means in accordance with its position in the cascade, providing a train of pulses to the cascade of switch operating means, the number of pulses in said train corresponding to the address of the switch operating means for the desired switch means, subtracting one pulse from said train at each switch operating means and passing the remainder to the succeeding switch operating means, and causing the one of said switch operating means which receives only a single pulse to operate its associated switch means.

15. A method as claimed in claim 14 further comprising the steps of causing the first pulse in said train to switch all of said switch operating means in said cascade to a first state and causing the remaining pulses to switch said switch operating means to a second state, and causing the one of said switch operating means which receives only a single pulse to operate its associated switch means in response to the first state and to passage of said first pulse.

16. A switching system for selectively connecting one component from each of a number of groups of components to form a system comprising a plurality of cascades of switch modules, the number of cascades corresponding to the number of different types of components in said system, the number of switch modules in the respective cascades corresponding to the number of each type of component available, each cascade defining a signal bus for a type of component, the signal buses of the various cascades being connected to form said system, each switch module in each cascade having signal terminals for connection of a component thereto, logic means responsive to a train of address pulses to its cascade for providing an output signal when the number of pulses in said train corresponds to its position in the cascade, and switch means associated with each logic means and responsive to the output signal therefrom for connecting said signal terminals to said signal bus, said switching system further comprising means for providing a train of address pulses to each cascade, each train having a number of pulses corresponding to the position of a particular component in the cascade, whereby one component of each type may be selectively connected to the signal bus to form said system.

17. A switching system as claimed in claim 16 wherein said components are audio components forming an audio system and further comprising an audio signal damping circuit in said signal bus for providing a desired amount of attenuation of signals in said signal bus, and a cascade of damping selector modules associated with said damping circuit, each damping selector module including means for programming a desired amount of attenuation for said damping circuit, logic means responsive to a train of address pulses to the cascade for providing an output signal when the number of pulses in said pulse train corresponds to its position in the cascade, and switch means associated with each logic means and responsive to the output signal therefrom for enabling the associated programming means to program said damping circuit.

18. In a system for comparing the performance of audio speakers having different power efficiencies, said speakers being selectively connectable to a signal source, programmable signal dampening apparatus comprising a damping circuit associated with said signal source, said damping circuit being programmable to provide a selectable amount of attenuation of signals provided to a speaker connected to said signal source, a plurality of damping selector modules each associated with a corresponding said speaker, each damping selector module including means for programming an amount of attenuation for said damping circuit in accordance with the power efficiency of the corresponding said speaker, and means for enabling the programming means of one of said modules to program said damping circuit when the corresponding said speaker is connected to said signal source, whereby the magnitude of the signal provided to said speaker by said signal source is automatically adjusted in accordance with the power efficiency of said speaker.

19. Apparatus as claimed in claim 18 wherein said damping circuit includes an attenuator network and means for switching attenuating components into and out of said network.

20. Apparatus as claimed in claim 19 wherein said programming means for each damping selector module includes selector switch means for providing operating paths to selected ones of said attenuating component switching means.

21. Apparatus as claimed in claim 20 wherein said enabling means includes a logic circuit for providing an output signal in response to an address signal selecting said module, and means responsive to said output signal for operating said attenuating component switching means selected by said selector switch means.

* * * * *